United States Patent [19]

Van Maanen

[11] Patent Number: 4,561,237
[45] Date of Patent: Dec. 31, 1985

[54] APPARATUS FOR PACKING ARTICLES FED IN A CONTINUOUS FLOW

[75] Inventor: Johannes D. Van Maanen, Berkel en Rodenrijs, Netherlands

[73] Assignee: Tevopharm Schiedam B.V., Schiedam, Netherlands

[21] Appl. No.: 648,628

[22] Filed: Sep. 10, 1984

Related U.S. Application Data

[63] Continuation of Ser. No. 281,464, Jul. 8, 1981, abandoned.

[30] Foreign Application Priority Data

Jul. 10, 1980 [NL] Netherlands ............... 8003991

[51] Int. Cl.[4] ................. B65B 9/12; B65B 51/30
[52] U.S. Cl. ................................. 53/548; 74/394
[58] Field of Search ............... 74/393, 436; 53/548, 53/550-555

[56] References Cited

U.S. PATENT DOCUMENTS 3,173,525 3/1965 Hergert .................. 74/394 X
3,485,010 12/1969 Lehmann .................... 53/285
3,850,780 11/1974 Crawford ................ 53/550 X

FOREIGN PATENT DOCUMENTS 1175245 3/1959 France .
1256142 2/1961 France .

Primary Examiner—A. J. Heinz

[57] ABSTRACT

An apparatus for packing articles having at least two sealing rollers mounted for rotation by a mechanism so that the rollers are rotated with a non-constant rotational velocity. The mechanism comprises a crank arm and a coupling member, and a driving cam is provided which is shiftable in a slot formed in a follower member extending parallel to the crank arm. The design is such that every time the axis of rotation of the crank arm has moved along a complete circular path the crank arm is rotated at least one time over 360°.

4 Claims, 3 Drawing Figures

APPARATUS FOR PACKING ARTICLES FED IN A CONTINUOUS FLOW

This application is a continuation of application Ser. No. 281,464, filed July 8, 1981, now abandoned.

The invention relates to an apparatus for packing articles or bundles of articles, in which said articles are fed in a continuous flow in equally spaced apart relation and wrapped continuously by a web of packing material. More specifically it comprises means for advancing the articles to be packed continuously in spaced apart relation, means for the continuous supply of a continuous web of packing material, means for wrapping said material around the articles, means for forming a longitudinal sealing seam and driving the wrap formed around the articles with a predetermined velocity, means for adhering the longitudinal sealing seam portions to each other and means for forming a transverse sealing seam between the articles and for severing it. The means for forming the transverse sealing seam is constituted by at least two rollers mounted for rotation and provided with at least one sealing jaw, said jaws being capable of gripping the wrap of packing material between them in the opposing cooperating position, while the rollers are in driving connection with each other and one of the rollers is connected to a driving shaft of the packing apparatus through a mechanism by which mechanism the rollers are rotated with a non-constant rotational velocity. Such a type of packing apparatus is known from the Dutch Patent Application No. 6901069.

In a packing apparatus of said type the articles advanced in a continuous flow are wrapped continuously and the wrap with the articles disposed within it is passed with a predetermined velocity through the sealing rollers for producing the transverse sealing seams between the articles. At the moment that the sealing jaws come into gripping engagement with the wrap, the rotational velocity of the sealing rollers should be approximately ly equal to the velocity of the wrap, while at the moment of engagement said sealing jaws should be accurately positioned between said articles, so that the rotational velocity of the rollers should meet two conditions, which is difficult to realize with a constant rotational velocity. Therefore, between the driving shaft rotating with a constant velocity and the driven sealing roller, a mechanism is provided by which the rollers rotate with a non-constant velocity.

In the known device said mechanism is formed by an epicycloid gear transmission having the disadvantage that during a rotation over 360° only once a deceleration and once an acceleration of the rotational velocity of the sealing rollers can be obtained, so that each of the sealing rollers can have only one sealing jaw.

The object of the invention is to provide a packing apparatus of the above-mentioned type having a mechanism between the driving shaft and the driven sealing roller, which during rotation over 360° permits several times a deceleration and an acceleration of the rotational velocity of the sealing rollers.

This is achieved in that in the apparatus according to the invention the mechanism comprises a crank arm which is connected for a rotational movement around a shaft extending perpendicular to the arm to a coupling member mounted for rotation around a shaft extending in spaced relation parallel to the rotational shaft of the crank arm and connected with the driving shaft, so that at rotation of the coupling member the axis of rotation of the crank arm moves along a circular path with a constant velocity, while at the crank arm a driving cam is provided which is received shiftable in a slot formed in a follower member extending parallel to the crank arm and fixed to a shaft which is in driving connection with a sealing roller, the axis of said shaft extending perpendicular to the follower member in spaced apart relation with the driving cam, while said slot extends in radial direction with respect to said axis and the crank arm is provided with means by which every time the axis of rotation of the crank arm has moved along a complete circular path said arm is rotated at least twice over 360° around said axis.

In this way, by rotating the crank arm several times over 360° around its axis of rotation during a complete revolution, correspondingly several times a deceleration and an acceleration of the rotational velocity of the sealing rollers can be obtained, so that said sealing rollers can be provided with a plurality of sealing jaws positioned at equal angular distances from each other.

As it is often desired that with one and the same apparatus articles of different length can be packed, for which the velocity of the wrap with the articles disposed therein should be variable and therefore also the rotational velocity of the sealing rollers at the moment that their sealing jaws are in engagement with the web should be variable, the driving cam is preferably displaceable in radial direction as to the axis of rotation of the crank arm. By varying the location of the driving cam on the crank arm the rotational velocity of the sealing rollers during the sealing operation is changed also.

Advantageously the crank arm is fixed to a stub axle received rotatably in the coupling means and protruding at the side facing away from the crank arm from said coupling means, around said protruding portion of the stub axle a pinion being mounted which is in meshing engagement with a fixed gear rim. Said coupling means can be fixed to a sleeve which is in driving connection with the driving shaft so that said sleeve is rotated around its axis, the shaft driving the sealing roller extending through the sleeve. The sleeve can be journaled within the fixed gear rim.

In this way a compact construction of the driving mechanism is obtained.

The invention will now be described in more detail while referring to the drawing, in which.

Figure 1:
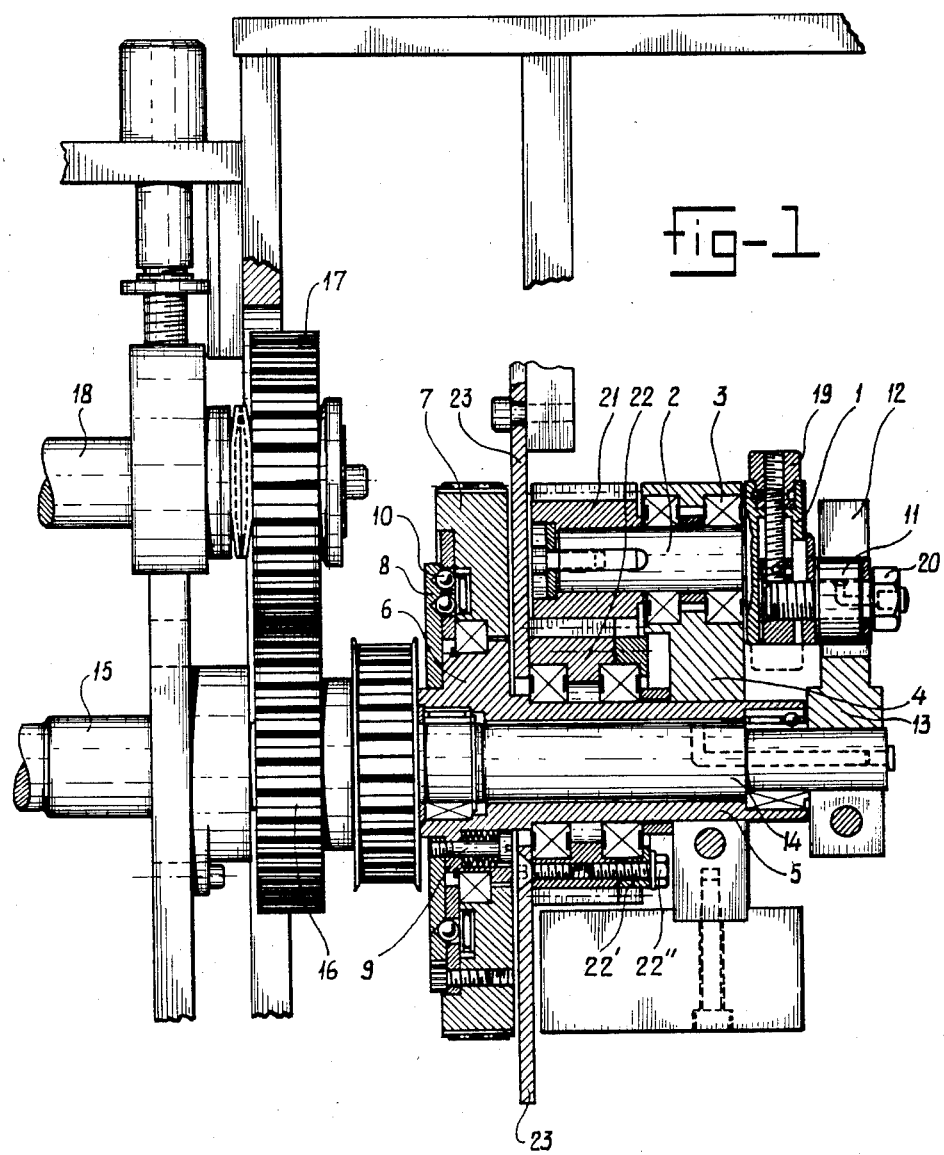
FIG. 1 shows the driving mechanism of the sealing rollers in axial section.
Figure 2:
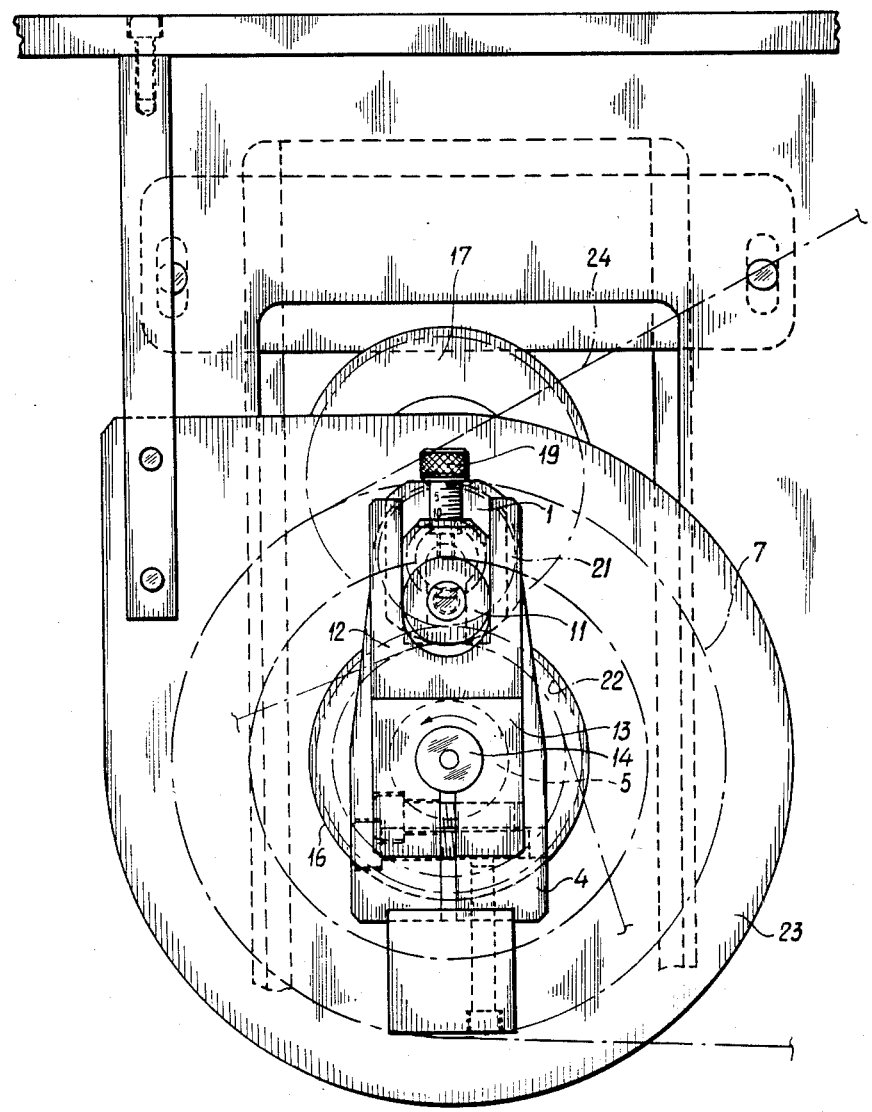
FIG. 2 is a side-view of the driving mechanism according to FIG. 1.

As shown in FIGS. 1 and 2 a crank arm 1 is fixed to a stub axle 2 mounted for rotation in a coupling means 4 by means of roller bearings 3. The coupling means 4 is clamped around a sleeve 5 which at its other end carries a boss 6 which is connected with the driving disc 7 by means of a disc 8 fastened to the boss 6 by means of resiliently mounted bolts 9, while through balls 10 disposed in recesses in the disc 8 the driving disc 7 is coupled with the disc 8 so that at a too high resistance or overloading the balls 10 are withdrawn from the recesses, so that the disc 8 is pushed away and the driving disc 7 may rotate freely around the boss 6 of the sleeve, whilst by pushing away the disc 8 said disc may activate a microswitch not shown, by which the apparatus is stopped.

The crank arm 1 carries a driving cam 11 having the shape of a roller, said roller 11 being received shiftable in the slot 12 of the follower member 13. The follower member 13 is provided around the shaft 14 extending through the sleeve 5 and directly connected to the shaft 15 of a sealing roller not shown. Around the shaft 15 a gear 16 is provided which is in meshing engagement with the gear 17 around the shaft 18 of the second sealing roller.

The position of the roller 11 with respect to the crank arm 1 is adjustable by means of the adjusting screw 19, whereas the roller 11 can be fixed in each position by means of the tap bolt 20.

Around the end of the stub axle 2 projecting from the coupling means 4 a pinion 21 is fixed, said pinion being in meshing engagement with the gear rim 22 fastened firmly to the fixed frame 23. The gear rim 22 has a portion 22' radially adjustable with respect to the remaining portion, said portion 22' being provided with slotted holes for the tap bolts 22''. In this way tooth clearance can be eliminated.

Figure 3:
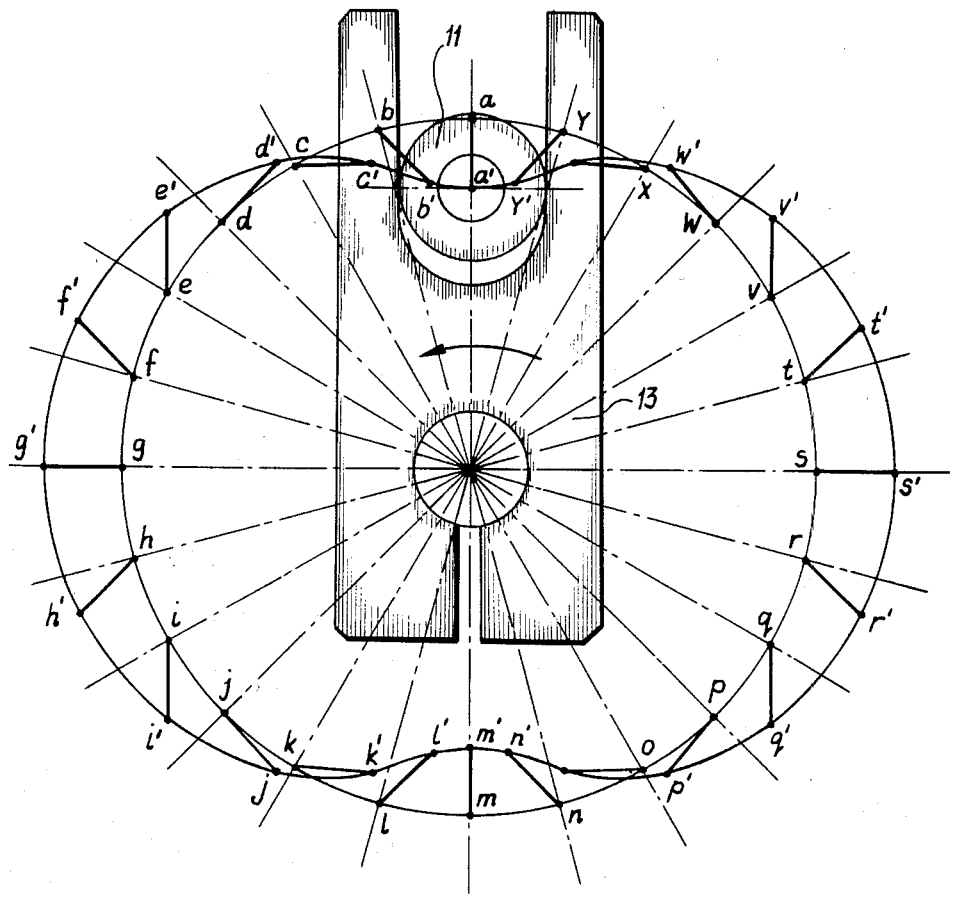
FIG. 3 illustrates the operation of the driving mechanism.

In operation the driving wheel 7 is driven by a driving shaft not shown through the toothed belt 24, by which through the boss 6, the sleeve 5 and the coupling means 4 the pivot axis of the crank arm 1, i.e. the axis of the stub axle 2 will move along a circular path with a constant velocity as shown in FIG. 3, in which a number of positions of the axis of rotation at equal angular distances from each other are indicated by a,b,c . . . v, w, x, y, z. During the movement of the axis of rotation along the circular path the crank arm 1 is also rotated around said axis of rotation, since the pinion 21 revolves along the gear rim 22, so that the axis of the roller 11 moves along the path shown in FIG. 3 by the points a', b', c' . . . v', w', x', y'. It appears clearly from FIG. 3 that the axis of the roller 11 and thus the roller 11 itself and the follower member 13 driven thereby are accelerated along the path sections a'-g' and m'-s' and are decelerated along the path sections g'-m' and s'-a', the velocities being the smallest at the points a' and m'. Consequently, the rotational velocities of the shafts 15 and 18 and the not shown sealing rollers connected thereto are decelerated and accelerated, the sealing rollers each being provided with two sealing jaws, which come to lie in opposite relation to each other at locations corresponding to the points a' and m' respectively for producing the transverse sealing seams between the articles in the wrap of packing material.

I claim:

1. In an apparatus for packing articles for bundles of articles, said apparatus having a driving shaft and at least two rollers mounted for rotation and for forming a transverse sealing seam between the articles, said rollers being in driving connection with each other: a mechanism interposed between said driving shaft and one of said rollers, for rotating the rollers with a non-constant rotational velocity above zero, said mechanism comprising a crank arm which is connected, for a rotational movement around an axis extending perpendicular to the arm, to a coupling member mounted for rotation around an axis extending in spaced relation parallel to the rotational axis of the crank arm and connected with the driving shaft, so that upon rotation of the coupling member the axis of rotation of the crank arm moves along a circular path with a constant velocity, a driving cam provided at said crank arm and shiftable in a slot formed in a follower member extending parallel to the crank arm and fixed to a shaft which is in driving connection with one of said rollers, said driving cam being mounted for movement in radial direction with respect to the axis of rotation of said crank arm, the axis of said shaft extending perpendicular to the follower member in spaced apart relation with the driving cam, said slot extending in radial direction with respect to said axis of said shaft, said crank arm being provided with means for adjusting the position of said cam with respect to the axis of rotation of said crank arm so that every time the axis of rotation of the crank arm moves along a complete circular path said crank arm is rotated more than one time over 360° around said axis.

2. In the apparatus according to claim 1, the crank arm being fixed to a stub axle which is received rotatably in the coupling member and protrudes from said coupling member at the side thereof facing away from the crank arm, a pinion being mounted around said protruding portion of the stub axle and being in meshing engagement with a fixed gear rim.

3. In the apparatus according to claim 2, the coupling member being fixed to a sleeve which is in driving connection with the driving shaft so that the sleeve is rotated around its axis, the shaft for driving said one roller extending through said sleeve.

4. In the apparatus according to claim 3, said sleeve being journaled within said fixed gear rim.

* * * * *